US008848333B2

(12) United States Patent
Nestler

(10) Patent No.: US 8,848,333 B2

(45) Date of Patent: Sep. 30, 2014

(54) ELECTRONIC TRIP UNIT FOR AN ELECTRICAL SWITCH

(75) Inventor: Johannes Nestler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 335 days.

(21) Appl. No.: 13/364,649

(22) Filed: Feb. 2, 2012

(65) Prior Publication Data

US 2012/0200977 A1 Aug. 9, 2012

(30) Foreign Application Priority Data

Feb. 3, 2011 (DE) ........................ 10 2011 003 598

(51) Int. Cl.

*H02H 7/00* (2006.01)
*H01H 71/08* (2006.01)
*H01H 47/00* (2006.01)

(52) U.S. Cl.

CPC ............. *H01H 71/08* (2013.01); *H01H 47/001* (2013.01)
USPC .......................................................... 361/115

(58) Field of Classification Search

USPC .......................................................... 361/115
See application file for complete search history.

(56) References Cited

U.S. PATENT DOCUMENTS 4,870,531 A * 9/1989 Danek .......................... 361/93.1

FOREIGN PATENT DOCUMENTS

| | | |
|---|---|---|
| DE | 3603750 | 8/1987 |
| DE | 19807710 | 9/1999 |
| DE | 69425387 | 3/2001 |
| EP | 0779640 | 6/1997 |
| EP | 1990879 | 11/2008 |

OTHER PUBLICATIONS

German Priority document for German Application No. DE 10 2011 003 598.2 filed Feb. 3, 2011 (Not Yet Published).

* cited by examiner

*Primary Examiner* — Stephen W Jackson

(74) *Attorney, Agent, or Firm* — Harness, Dickey & Pierce, P.L.C.

(57) ABSTRACT

An electronic trip unit for an electrical switch is disclosed which has at least one electrical connection, and which can be mounted in an electrical switch and in the mounted state interoperates with the latter for the purpose of tripping the switch and where, with the electrical switch in its built-in position, the mounted trip unit has at least one front surface facing towards the front, at least one rear surface facing towards the rear and side surfaces, and whereby with the trip unit in its mounted state at least one of the side surfaces is freely accessible, and where the electrical connection is located on one of the freely accessible side surfaces of the trip unit.

7 Claims, 2 Drawing Sheets

ELECTRONIC TRIP UNIT FOR AN ELECTRICAL SWITCH

PRIORITY STATEMENT

The present application hereby claims priority under 35 U.S.C. §119 to German patent application number DE 10 2011 003 598.2 filed Feb. 3, 2011, the entire contents of which are hereby incorporated herein by reference.

BACKGROUND

Electrical switches are used for switching electrical currents. One class of electrical switches is the so-called power switches (line circuit breakers), which can typically switch currents of more than 100 A. Line circuit breakers are typically accommodated in a housing. The individual phases of the current are typically switched in so-called pole cassettes. Pole cassettes are housings in which are accommodated a movable and a fixed contact, which can be mechanically separated or brought together for the purpose of switching the currents off or on respectively. The mechanisms for activating the switching off and on of the individual pole cassettes are put together in such a way that they can be switched using a single handle at the electrical switch.

In addition to the function of switching the electric current on or off, as appropriate, the housing for an electrical switch often accommodates an electronic trip unit (ETU). An electronic trip unit has the task of analyzing a current signal received from the electrical switch, for example in respect of short circuits or overcurrents. As soon as it detects a short circuit or an overcurrent, the electronic trip unit trips the electrical switch, which means that the switch is switched off, in that the contacts are separated and the current flow is thereby interrupted.

In many applications, the electronic trip unit is linked with other electrical devices for further processing of its input or output signals. These other electrical devices could be, for example, a residual current device (RCD) or an external N-conductor converter. These are typically linked to the electronic trip unit by means of a cable connection, where the electronic trip unit itself interoperates with the electrical switch through contacts in the latter's housing. The connections for the other electrical devices are typically located on the operating area of the electronic trip unit, where they can be accessed after removal of a cover. Equally, the connections for the other electrical devices can be located in a so-called accessory holder on the switch. Accessory holder is the term used for a space in the housing of an electrical switch which, in the built-in position, is located alongside the handle, while the electronic trip unit is typically arranged above or below the handle.

Typically, the electrical switches described above will be built into a switchgear cabinet. This is provided with a door to prevent unauthorized operation of the switches and other built in items. For reasons of space, there is often not much room available between the surface of the electrical switch and the door. If the connections for the other electrical devices are now located on the operating area of the electronic trip unit, or in an accessory holder, it is often only with difficulty possible to close the door of the switchgear cabinet, or switchgear cabinets with a greater installation depth are required, as applicable.

SUMMARY

In at least one embodiment of the invention, an electronic trip unit for an electrical switch is disclosed with at least one electrical connection to which other electrical devices can be connected in the most space-saving way possible.

The electronic trip unit for an electrical switch of at least one embodiment includes at least one electrical connection, where the trip unit can be mounted in the electrical switch and in the mounted state interoperates with the latter for the purpose of tripping the switch and where, with the electrical switch in its built-in position, the mounted trip unit has at least one front surface facing towards the front, at least one rear surface facing towards the rear and side surfaces, and whereby with the trip unit in its mounted state at least one of the side surfaces is freely accessible, where the electrical connection is located on one of the freely accessible side surfaces of the trip unit.

BRIEF DESCRIPTION OF THE DRAWINGS

The invention is explained below by reference to the following figures.

FIG. 2 shows an electronic trip unit for an electrical switch with three electrical connections and a plug plugged in.

DETAILED DESCRIPTION OF THE EXAMPLE EMBODIMENTS

Figure 1:
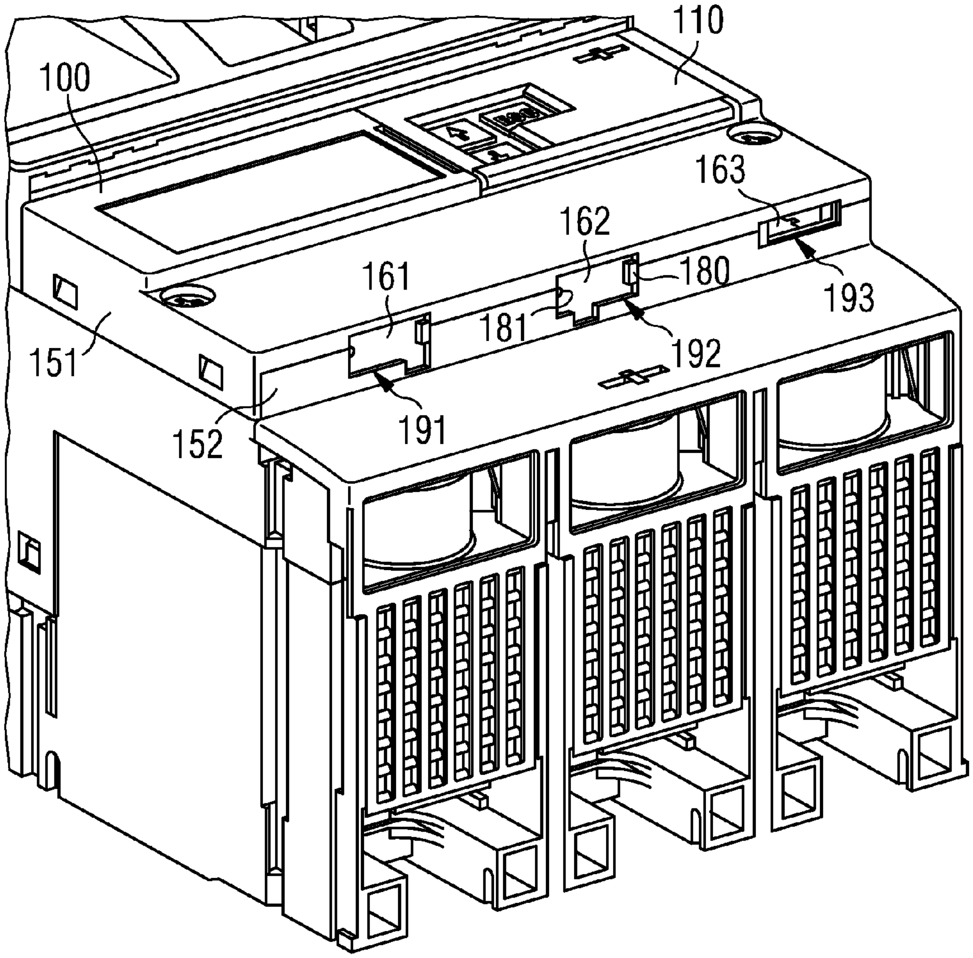
FIG. 1 shows an electronic trip unit for an electrical switch with three electrical connections.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows an electrical switch with an electronic trip unit 100. The electronic trip unit is mounted in the electrical switch, and interoperates with this to trip the switch. The electronic trip unit 100 is here typically introduced into a well in the housing of the electrical switch, and makes contact by way of plug-in contacts. On each electronic trip unit 100 there is, when it is mounted in the electrical switch and the latter is in its built-in position, at least one front surface which faces forward, at least one rear surface which faces backward and side surfaces. On its operating area, which is formed from one of the front surfaces, the electronic trip unit 100 has a front cover 110. Connections for further electrical devices have until now typically been located under this front cover 110.

In its mounted position, the electronic trip unit 100 in FIG. 1 has freely accessible surfaces 151 and 152. Further side surfaces of the trip unit 100 can be hidden in the housing of the electrical switch, and are therefore not freely accessible. The electronic trip unit 100 has in addition three electrical connections 191, 192 and 193. In FIG. 1 these are arranged on the side surface 152 of the electronic trip unit 100. The electrical connections 191, 192 and 193 are in the form of openings in the housing of the electronic trip unit 100.

Electrical switches are often mounted in switchgear cabinets in which several electrical switches are arranged beside each other. This makes it advantageous if the electrical connections 191, 192 and 193 are not arranged on the side surface 151, because a neighboring electrical switch can be mounted here. It is therefore advantageous if the electrical connections 191, 192 and 193 are pointing downward when the electrical switch is in its built-in position, as shown on the side surface 152 in FIG. 1.

Due to the fact that when the electrical switch is in its built-in position the electrical connections 191, 192 and 193 are pointing downward, little space is used when a plug and a connecting cable are connected to the electrical connections 191, 192 and 193 for the purpose of linking to the outputs from another electrical device, and the overall height of a cabinet which surrounds the switch does not need to be increased.

The electrical connections 191, 192 and 193, which are shown in FIG. 1 as openings in the side surface 152 of the electronic trip unit 100, are provided with closing elements 161, 162 and 163. These closing elements prevent the electrical contacts from becoming soiled or being touched. The closing elements 161, 162 and 163 are constructed in one piece, and each has an engagement point 181 and a bulge 180. When a closing element 161, 162, 163 is in the closed state, the engagement point 181 engages with the housing of the electronic trip unit 100. The engagement point 181 prevents the closing element 161, 162, 163 from being unintentionally opened. Precisely in the situation when the electrical switch is tripped, it suffers mechanical shaking and the engagement point 181 prevents the unintended opening of the closing element 161, 162, 163. The bulge 180 simplifies the pushing open or to of the closing element 161, 162, 163. The closing element 161 on the first electrical connection 191 is shown in FIG. 1 as being closed. In FIG. 1 the closing element 162 on the second electrical connection 192 is also in the closed position. The closing element 163 on the third electrical connection 193 is shown as open in FIG. 1. In the case of the third connection 193, only the bulge 180 can still be seen, this being easy for an user to get hold of for the purpose of closing the closing element 163.

The closing elements 161, 162 and 163, which are constructed in one piece, can be manufactured from plastic. This can be a thermo- or duro-plastic material.

The closing elements 161, 162, 163 are joined to the electronic trip unit 100 in such a way that they cannot be lost. The design of the closing element, which is constructed in one piece and is joined to the electronic trip unit so that it cannot be lost, and the provision of an engagement point for the closing element and a bulge on it, secure the electrical connection 191, 192, 193 in a particularly convenient way against touching and dirt.

Figure 2:
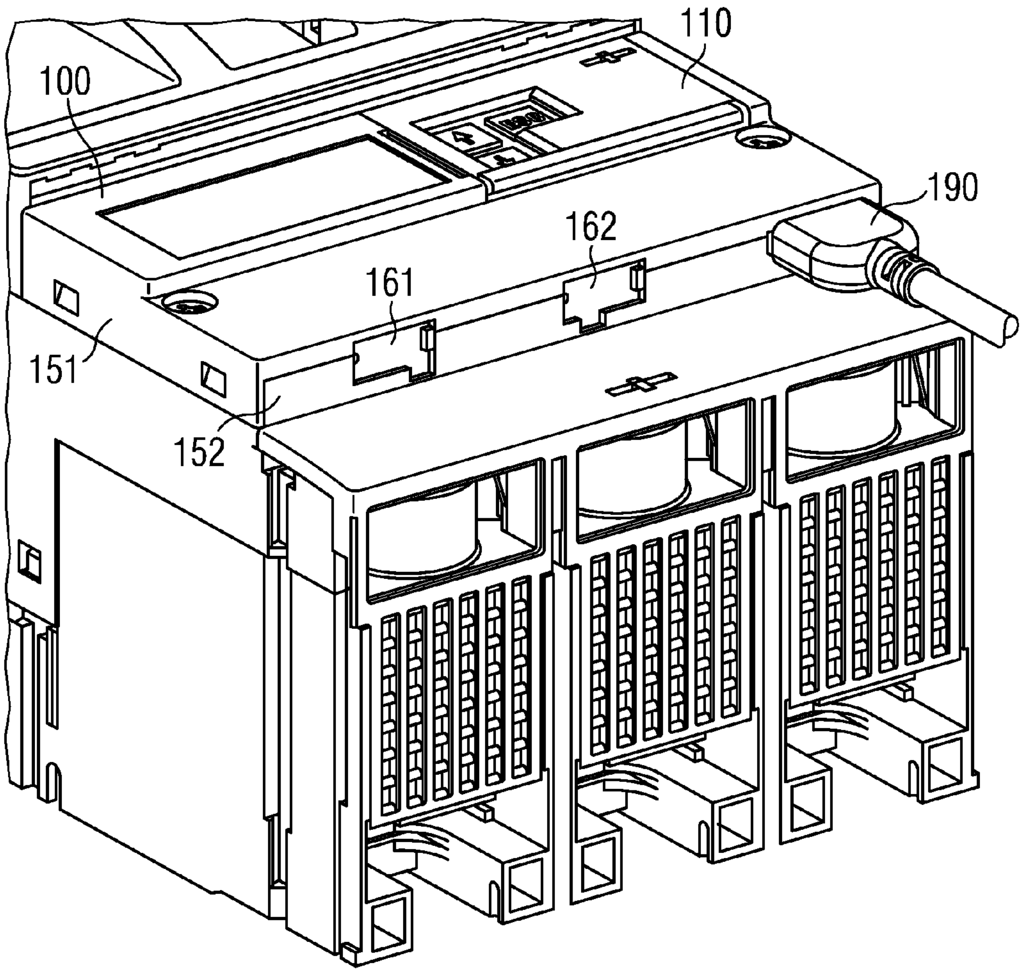

In FIG. 2, the electrical connections 191, 192, 193 are in the form of sockets, into each of which a plug can be plugged. The closing element 163 for the third electrical connection 193 is open, and the plug 190 is introduced into this opening. Via this plug and its associated cable, a further electrical device can be connected to the electronic trip unit 100.

In accordance with an embodiment of the invention, the electronic trip unit 100 can be provided with any desired number of electrical connections on one of the side surfaces of the trip unit.

The socket, into which the plug for a further electrical device can be plugged, can be constructed as a circuit board with contact areas. The electrical connection can equally well be an electrical contact array or a socket for an electrical contact array, as appropriate. All the possible connection technologies for plug connections can be implemented in the electrical connection.

The electronic trip unit for an electrical switch of an embodiment includes at least one electrical connection, where the trip unit can be mounted in the electrical switch and in the mounted state interoperates with the latter for the purpose of tripping the switch and where, with the electrical switch in its built-in position, the mounted trip unit has at least one front surface facing towards the front, at least one rear surface facing towards the rear and side surfaces, and whereby with the trip unit in its mounted state at least one of the side surfaces is freely accessible, where the electrical connection is located on one of the freely accessible side surfaces of the trip unit.

It is advantageous here if the overall height of a switchgear cabinet in which the electrical switch is mounted does not need to be increased when further electrical devices are connected up.

In one form of embodiment, with the electrical switch in its built-in position, the electrical connection is pointing downward. This ensures that the cabling for further electrical devices can be undertaken in a particularly space-saving way.

In another form of embodiment, provision is made that the electrical connection is provided with a closing element. This ensures that the connection is protected against dirt and touching.

The closing element can advantageously be constructed in one piece. By this, it can be manufactured particularly economically.

In another embodiment of the invention, the closing element is provided with an engagement point which, with the closing element in its closed state, engages with the housing of the trip unit. By this, the unintentional opening of the closing element can be prevented.

The closing element can advantageously also be provided with a bulge, so that it is easier to use when opening or closing the closing element.

In another form of embodiment, the closing element is joined to the electronic trip unit in such a way that it cannot be lost.

The electrical connection can be constructed as a socket into which a plug can be plugged.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electronic trip unit for an electrical switch, comprising:

at least one electrical connection, the electronic trip unit being mountable in the electrical switch, the mounted trip unit being configured to interoperate with the electrical switch for tripping the electrical switch and, with the electrical switch in a built-in position, the mounted trip unit including at least one front surface facing towards the front, at least one rear surface facing towards the rear and side surfaces, at least one of the side surfaces being freely accessible in the mounted trip unit, and the at least one electrical connection being located on one of the freely accessible side surfaces of the electronic trip unit, wherein, with the electrical switch in its built-in position, the at least one electrical connection faces downward relative to the front surface.

2. The electronic trip unit as claimed in claim 1, wherein the at least one electrical connection includes a closing element that prevents access to the at least one electrical connection when the electrical connection is not occupied.

3. The electronic trip unit as claimed in claim 2, wherein the closing element is constructed in one piece.

4. The electronic trip unit as claimed in claim 2, wherein the closing element is provided with an engagement point which, with the closing element in its closed state, engages with the housing of the trip unit.

5. The electronic trip unit as claimed in claim 2, wherein the closing element is provided with a bulge so that it is easier to use when opening or closing the closing element.

6. The electronic trip unit as claimed in claim 2, wherein the closing element is joined to the electronic trip unit in such a way that it cannot be lost.

7. The electronic trip unit as claimed in claim 1, wherein the at least one electrical connection is constructed as a socket into which a plug is pluggable.

* * * * *